US011889579B2

(12) United States Patent
Mildh et al.

(10) Patent No.: US 11,889,579 B2
(45) Date of Patent: Jan. 30, 2024

(54) QOS FLOWS INACTIVITY COUNTERS

(71) Applicant: Telefonaktiebolaget LM Ericsson (publ), Stockholm (SE)

(72) Inventors: Gunnar Mildh, Sollentuna (SE); Matteo Fiorani, Solna (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 392 days.

(21) Appl. No.: 16/491,015

(22) PCT Filed: Mar. 23, 2018

(86) PCT No.: PCT/EP2018/057536
§ 371 (c)(1),
(2) Date: Sep. 4, 2019

(87) PCT Pub. No.: WO2018/172548
PCT Pub. Date: Sep. 27, 2018

(65) Prior Publication Data
US 2019/0394830 A1   Dec. 26, 2019

Related U.S. Application Data

(60) Provisional application No. 62/476,701, filed on Mar. 24, 2017.

(51) Int. Cl.
*H04W 76/38* (2018.01)
*H04W 28/02* (2009.01)

(52) U.S. Cl.
CPC ....... *H04W 76/38* (2018.02); *H04W 28/0268* (2013.01)

(58) Field of Classification Search
None
See application file for complete search history.

(56) References Cited

U.S. PATENT DOCUMENTS 6,668,175 B1 * 12/2003 Almgren ............... H04L 47/808
455/516
7,898,995 B2   3/2011 Shahidi et al.
10,849,186 B2 * 11/2020 Dao .................. H04W 36/0022
(Continued)

FOREIGN PATENT DOCUMENTS

KR    20090122961 A    12/2009

OTHER PUBLICATIONS

NTT Docomo, Inc., "Study on New Radio Access Technology", 3GPP TSG RAN Meeting #74, Vienna, Austria, Dec. 5, 2016, pp. 1-148, RP-162201, 3GPP.
(Continued)

*Primary Examiner* — Christopher T Wyllie
(74) *Attorney, Agent, or Firm* — Christopher & Weisberg. P.A.

(57) ABSTRACT

A technique for a device (100) to manage a data flow (608; 618) in a wireless communication system is described. As to a method aspect of the technique, a time period for which the data flow (608; 618) has been inactive is obtained. The data flow (608; 618) is defined by a Quality of Service, QoS, requirement of data associated with the data flow (608; 618). Based on the time period, it is determined to release a mapping between the data flow (608; 618) and a radio bearer (610).

12 Claims, 9 Drawing Sheets

(56) References Cited

U.S. PATENT DOCUMENTS

| | | | |
|---|---|---|---|
| 10,856,274 B2* | 12/2020 | Ji | H04W 52/242 |
| 2003/0112789 A1* | 6/2003 | Heinonen | H04W 28/16 |
| | | | 370/352 |
| 2005/0130656 A1* | 6/2005 | Chen | H04W 36/0058 |
| | | | 455/436 |
| 2005/0239465 A1* | 10/2005 | Lee | H04W 36/26 |
| | | | 455/442 |
| 2007/0259673 A1* | 11/2007 | Willars | H04L 67/141 |
| | | | 455/450 |
| 2008/0020770 A1* | 1/2008 | Hofmann | H04W 36/22 |
| | | | 455/438 |
| 2008/0123527 A1* | 5/2008 | Shahidi | H04L 69/28 |
| | | | 370/231 |
| 2009/0186616 A1* | 7/2009 | Kim | H04W 36/26 |
| | | | 455/436 |
| 2010/0271943 A1* | 10/2010 | Wu | H04L 47/767 |
| | | | 370/331 |
| 2011/0205972 A1* | 8/2011 | Yuk | H04W 76/11 |
| | | | 370/328 |
| 2011/0312348 A1* | 12/2011 | Kulakov | H04W 52/0209 |
| | | | 455/458 |
| 2012/0008573 A1* | 1/2012 | Shiva | H04W 28/0205 |
| | | | 455/450 |
| 2012/0182859 A1* | 7/2012 | Ikeda | H04L 1/1835 |
| | | | 370/216 |
| 2012/0264443 A1* | 10/2012 | Ng | H04W 60/04 |
| | | | 455/450 |
| 2012/0275300 A1* | 11/2012 | Munoz de la Torre Alonso | |
| | | | H04L 41/5019 |
| | | | 370/229 |
| 2012/0289232 A1* | 11/2012 | Ostrup | H04W 36/00837 |
| | | | 455/436 |
| 2012/0314569 A1* | 12/2012 | Liu | H04W 36/30 |
| | | | 370/252 |
| 2013/0084867 A1* | 4/2013 | Sirotkin | H04W 76/28 |
| | | | 455/436 |
| 2014/0064124 A1* | 3/2014 | Paladugu | H04W 76/19 |
| | | | 370/252 |
| 2014/0134942 A1* | 5/2014 | Yu | H04W 36/0058 |
| | | | 455/7 |
| 2014/0153391 A1* | 6/2014 | Ludwig | H04L 41/0894 |
| | | | 370/230 |
| 2015/0131535 A1* | 5/2015 | Wallentin | H04W 76/15 |
| | | | 370/329 |
| 2015/0264739 A1* | 9/2015 | Hurtta | H04W 72/20 |
| | | | 370/329 |
| 2015/0327327 A1* | 11/2015 | Jain | H04W 76/36 |
| | | | 370/328 |
| 2016/0142954 A1* | 5/2016 | Cho | H04W 28/0865 |
| | | | 370/331 |
| 2017/0150549 A1* | 5/2017 | Olsson | H04W 8/02 |
| 2017/0353844 A1* | 12/2017 | Nylander | H04W 28/0268 |
| 2018/0041930 A1* | 2/2018 | Hampel | H04W 72/02 |
| 2018/0198867 A1* | 7/2018 | Dao | H04L 67/143 |
| 2019/0254086 A1* | 8/2019 | Tang | H04W 72/04 |
| 2019/0289506 A1* | 9/2019 | Park | H04W 36/0027 |
| 2019/0349819 A1* | 11/2019 | Xu | H04W 36/08 |
| 2020/0029252 A1* | 1/2020 | Marquezan | H04W 76/15 |
| 2020/0059867 A1* | 2/2020 | Haghighat | H04W 52/146 |
| 2020/0120610 A1* | 4/2020 | Chen | H04W 72/23 |
| 2020/0178280 A1* | 6/2020 | Guan | H04L 5/0048 |

OTHER PUBLICATIONS

Huawei et al., "TS 23.502—Minimizing Handover Signalling Overhead for PDU Sessions Having No Data Activity", SA WG2 Meeting #120, Busan, Korea, Mar. 27, 2017, pp. 1-14, S2-172003, 3GPP.

NTT Docomo et al., "Selective Deactivation of User Plane Connections", SA WG2 Meeting #119, Dubrovnik, Croatia, Feb. 13, 2017, pp. 1-5, S2-171171, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.3.1, Mar. 1, 2017, pp. 1-97, 3GPP.

3rd Generation Partnership Project, "3rd Generation Partnership Project; Technical Specification Group Services and System Aspects; Study on Architecture for Next Generation System (Release 14)", Technical Report, 3GPP TR 23.799 V0.3.0, Mar. 1, 2016, pp. 1-52, 3GPP.

3rd Generation Partnership Project, "3rd Generation Partnership Project; Technical Specification Group Services and System Aspects; Study on Architecture for Next Generation System (Release 14)", Technical Report, 3GPP TR 23.799 V14.0.0, Dec. 1, 2016, pp. 1-522, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V15.0.0, Dec. 1, 2017, pp. 1-181, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.3.0, Feb. 1, 2017, pp. 1-97, 3GPP.

* cited by examiner

100

200

QOS FLOWS INACTIVITY COUNTERS

TECHNICAL FIELD

The application relates to methods and apparatus for controlling data flows in a wireless communication network, and in particular, by utilizing an inactivity timer as a guide for remapping data flows or removing data flows.

BACKGROUND

A Quality of Service (QoS) framework has been discussed for a 5G system, e.g., according to the Third Generation Partnership Project (3GPP). In the QoS framework for the 5G system, the QoS-flow concept may replace an Evolved Packet Core (EPS) bearer concept.

A QoS-flow requires a given end-to-end QoS level. QoS-flows can be either GBR or non-GBR. Each QoS-flow is assigned a QoS-flow identifier (QFI) which is used to identify the flow in the 5G system. The number of QoS-flows per user equipment (UE) might be larger than the number of EPS bearers per UE, thus several QoS-flows with similar QoS requirements may be mapped over the same DRB (e.g., a data radio bearer) over the Uu interface. There is a two-level mapping, as a first level between Service Data Flows (SDF-flows) to QoS-flows and as a second level between QoS-flows to DRBs. The RAN controls the QoS-flows to DRBs mapping and in case the RAN decides that there is a flexible (e.g., other than 1:1) mapping between QoS-flows and DRBs, this mapping shall be transparent to the upper layers and shall have no impact on the N3 marking, e.g., for a reference point N3 between a User Plane Function, UPF, and the RAN. Each QoS-flow has an associated 5G QoS indicator (5QI) referring to QoS characteristics (e.g., Packet Delay Budget, PDB, etc.) and an ARP (e.g., an Allocation and Retention Priority) parameter. A limited number of 5QI characteristics is expected to be standardized (the role of 5QI in 5GS framework is expected to be similar as the role of QCI in the EPS bearer framework). It is up to the RAN to define the QoS-flows to DRBs mapping based on the 5QI.

Several A-type QoS flows can be established at the beginning of the PDU session, even if there is no data traffic associated to these flows. B-type QoS-flows are instead (or typically) established on-demand, e.g., when there is traffic associated to the flows. In addition, GBR flows will be subject to admission control in the RAN. The problem is that there is no clear solution that describes how to release the QoS flows and/or their mapping to DRBs in the RAN.

One solution would be that the NGC control plane (CP, e.g., at a Next Generation Core or NGC) explicitly informs the RAN to release QoS flows (e.g., similar how it is performed in an Evolved Packet Core, EPC, for 3GPP Long Term Evolution, LTE). The RAN can decide to also release the corresponding DRBs, i.e., the DRBs on which the flows were mapped. However, this solution does not allow any means to only remove the mapping between a QoS flow and a DRB, and keep the QoS flow, it only allows to remove the complete QoS flow. In addition, the mechanism requires a trigger from the CN i.e. it does not allow the RAN to by itself remove QoS flows. Therefore, an alternative solution is needed.

SUMMARY

As to one aspect, method for a device to manage a data flow in a wireless communication system is provided. The method may comprise or initiate a step of obtaining a time period for which the data flow has been inactive. The data flow may be defined by a Quality of Service (QoS) requirement of data associated with the data flow. Alternatively or in addition, the method may comprise or initiate a step of determining, based on the time period, to release a mapping between the data flow and a radio bearer.

Herein, "to manage" or "managing" may encompass "to control" or "controlling".

The method may further comprise or initiate a step of determining, based on the time period and/or a number of data flows mapped to the radio bearer, to remove the data flow.

The determining to release the mapping and/or to remove the data flow may comprise or initiate a step of determining that the time period is greater than or equal to a threshold value. The threshold value may be preconfigured by an access network and/or a core network. Alternatively or in addition, the threshold value may be dynamically configured by an access network and/or a core network.

The method may further comprise or initiate a step of mapping the data flow to a different radio bearer based on the time period. Optionally, the method may further comprise or initiate a step of resuming data communication on the data flow using the different radio bearer upon the data flow becoming active.

In any option, the different radio bearer may be a default radio bearer.

In any option, the step of obtaining the time period may comprise or initiate at least one of a step of determining that the data flow is inactive; a step of starting an inactivity counter that maintains the time period in response to determining that the data flow is inactive; and a step of obtaining the time period from the inactivity counter.

The step of determining that the data flow is inactive may comprise or initiate a step of determining that no user data is queued for transmission at one or more of the device and/or one or more other devices.

In any option, the method may further comprise or initiate a step of obtaining one or more rules from a network node for managing the data flow. Optionally, the method may further comprise or initiate a step of determining, based on the one or more rules, to release the mapping and/or to remove the data flow.

The method may further comprise of initiate a step of instructing a user equipment (UE) to release the mapping and/or to remove the data flow. Alternatively or in addition, the method may further comprise of initiate a step of providing one or more rules for managing the data flow to a UE.

In any option, the network node may be a device in a radio access network. Optionally, the method may further comprise of initiate a step of identifying that a UE has been or is to be handed over from a current cell to a different cell (e.g., in an RRC active state) and/or has or is to reselect from the current cell to the different cell (e.g., in an RRC inactive state). For example, the step of identifying may comprises receiving, from another device in the radio access network, a request to provide one or more parameters of the data flow to the other device.

Alternatively or in addition, the method may comprise or initiate a step of providing, based on the identifying, the time period, the mapping, a data flow identifier, an amount of data transferred over the data flow, a total time since the data flow was activated, one or more bit rates of the data flow, or any other characteristic of the data flow to another device of the wireless communication system that manages the different cell.

Alternatively or in addition, the method may comprise or initiate a step of maintaining the time period when a UE associated with the data flow is in an inactive state. In this context, the "inactive state" may relate to a radio resource control (RRC) state, for example an RRC inactive or RRC idle state. Alternatively or in combination, be the "inactive state" may be different from an inactivity of the data flow during an RRC active state, e.g., an inactivity triggering the inactivity counter.

Alternatively or in addition, the network node may be a device in a core network. Optionally, the method further comprises or initiates, based on determining to release the mapping and/or to remove the data flow, a step of transmitting a command to an access network node or a UE to release the mapping and/or to remove the data flow.

In any option, the time period may be measured in units of seconds, minutes, frames, transmission time intervals, subframes, slots, symbols, or any other unit indicative of time.

The data flow may have an associated data flow identifier. Optionally, the data flow identifier may be assigned by a core network node.

As to a device aspect, a device for managing a data flow in a wireless communication system is provided. The device may comprise an obtaining unit configured to obtain a time period for which the data flow has been inactive. The data flow may be defined by a Quality of Service (QoS) requirement of data associated with the data flow. Alternatively or in addition, the device may comprise a determining unit configured to determine, based on the time period, to release a mapping between the data flow and a radio bearer.

As to another device aspect, a device for managing a data flow in a wireless communication system is provided. The device may comprise at least one processor and a memory. Said memory may comprise instructions executable by said at least one processor whereby the device is operative to obtain a time period for which the data flow has been inactive. The data flow may be defined by a Quality of Service (QoS) requirement of data associated with the data flow. Alternatively or in addition, execution of the instruction may cause the at least one processor to determine, based on the time period, to release a mapping between the data flow and a radio bearer.

Any of the device aspects may be embodied by a UE, a radio access node and/or a core network node.

As to further aspects, a UE, a radio access node and/or a core network node comprising one or more processing circuits and at least one memory are provided. The one or more processing circuits may be configured to perform at least one instruction stored on the at least one memory such that the UE, the radio access node and/or the core network node performs any one of the steps the method aspect.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., via the Internet, the core network and/or the radio access network. Alternatively or in addition, the method may be encoded in a Field-Programmable Gate Array (FPGA) and/or an Application-Specific Integrated Circuit (ASIC), or the functionality may be provided for download by means of a hardware description language.

In any aspect, a radio access node may be a radio base station (RBS) or base station (BS) of the radio access network (RAN). The base station may encompass any station that is configured to provide radio access to one or more radio devices. Examples for the base station may include a 3G base station or Node B (NB), 4G base station or eNodeB (eNB), a 5G base station or gNodeB (gNB) and an access point (AP), e.g., a Wi-Fi AP.

A cellular network comprising at least one of the RAN and the core network (CN) may be implemented according to the Global System for Mobile Communications (GSM), the Universal Mobile Telecommunications System (UMTS), Long Term Evolution (LTE) and/or New Radio (NR or 5G). The data flow mapping may be backward compatible and/or extend those defined for 3GPP LTE or 5G without being limited thereto. Each aspect of the technique may be implemented using an Application Protocol for the communication between CN and RAN, or on a Physical Layer (PHY), a Medium Access Control (MAC) layer, a Radio Link Control (RLC) layer and/or a Radio Resource Control (RRC) layer of a protocol stack for the radio communication.

The radio device may be configured for peer-to-peer communication (e.g., on a sidelink) and/or for accessing the RAN (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrowband Internet of Things (NB-loT) or a combination thereof. Examples for the UE and the mobile station include a mobile phone and a tablet computer. Examples for the portable station include a laptop computer and a television set. Examples for the MTC device or the NB-loT device include robots, sensors and/or actuators, e.g., in manufacturing, automotive communication and home automation. The MTC device or the NB-loT device may be implemented in household appliances and consumer electronics. Examples for the combination include a self-driving vehicle, a door intercommunication system and an automated teller machine.

Any one of the devices, the base station, the core network node, a system (e.g., the communication system) combining the device aspects or any node (e.g., the host computer) or station for embodying the technique may further include any feature disclosed in the context of the method aspect, and vice versa. Particularly, any one of the units and modules, or a dedicated unit or module, may be configured to perform or initiate one or more of the steps of any one of the method aspects.

BRIEF DESCRIPTION OF THE DRAWINGS

Further details of embodiments of the technique are described with reference to the enclosed drawings, wherein.

DETAILED DESCRIPTION

Figure 1:
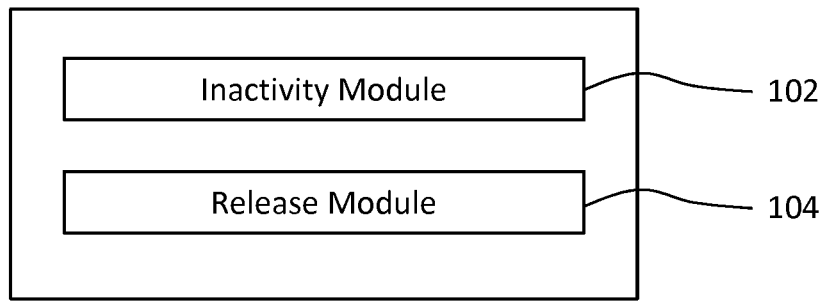
FIG. 1 illustrates a schematic block diagram for an embodiment of a device for managing a data flow in a wireless communication system.

FIG. 1 shows a schematic block diagram of an embodiment of a device for managing a data flow in a wireless communication system. The device is generically referred to by reference sign 100.

The device 100 may comprise an inactivity module 102 that obtains a time period for which the data flow has been inactive. The data flow may be defined by or associated with a Quality of Service (QoS) requirement of the data associated with the data flow. The device 100 may further comprise a release module 104 that determines, based on the time period, to release a mapping between the data flow and a radio bearer.

Any of the modules 102 and 104 may be implemented by respective units configured to perform the corresponding functionality.

Figure 2:
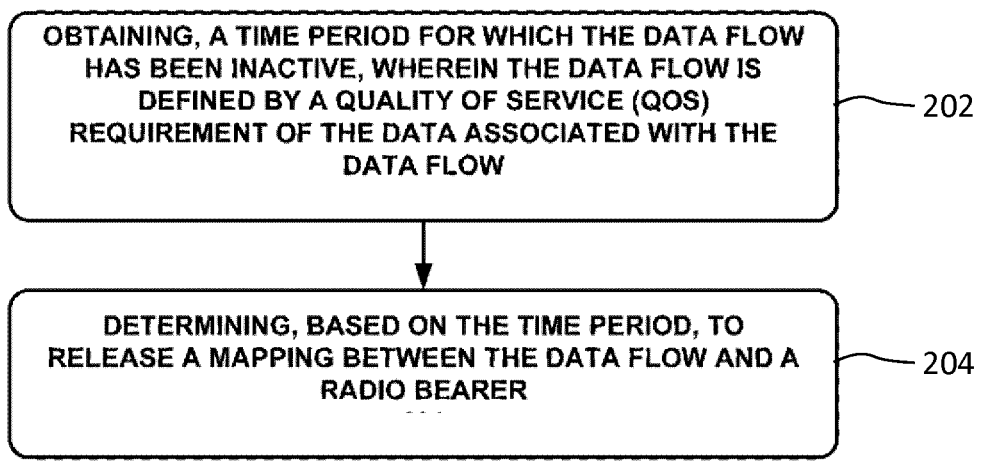
FIG. 2 illustrates a method performed by a device (e.g., UE, Core network node, or access network node) according to one or more embodiments.

FIG. 2 shows a flowchart for an implementation of a method of managing a data flow in a wireless communication system. The method is generically referred to by reference sign 200.

A time period for which the data flow has been inactive is obtained in a step 202 of the method 200. The data flow is defined by or associated with a Quality of Service (QoS) requirement of the data associated with the data flow. Based on the time period, a mapping between the data flow and a radio bearer is released, or it is determined to release the mapping, in a step 204 of the method 200.

The method 200 may be performed by a device to manage a data flow in the wireless communication system, e.g., one or more nodes of an access network (AN) or a radio access network (RAN) of the wireless communication system or one or more nodes of a core network (CN) of the wireless communication system. The method 200 may be performed by the device 100. For example, the modules 102 and 104 may perform the steps 202 and 204, respectively.

Figure 5:
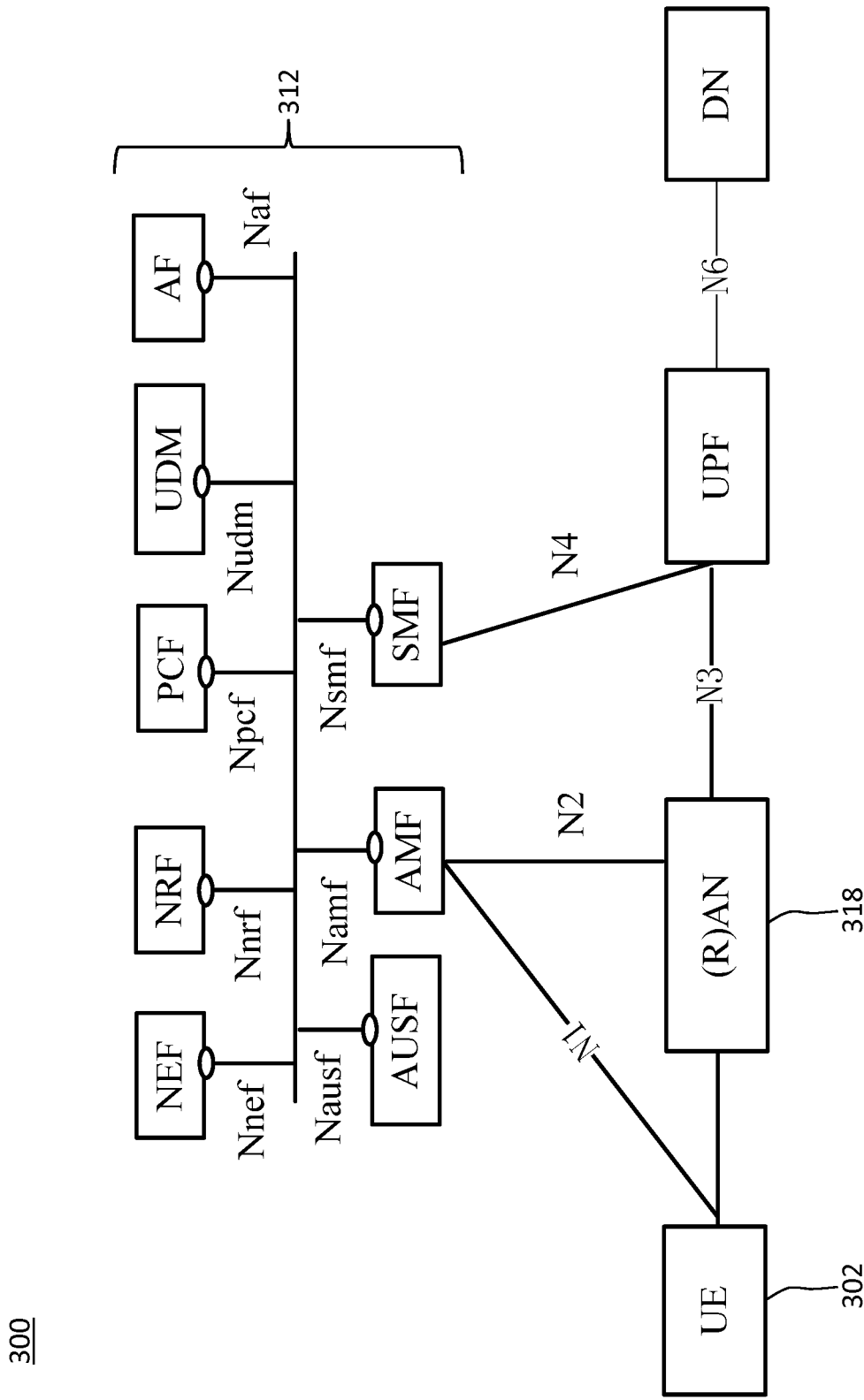
FIG. 5 shows an example network architecture of the present disclosure.

FIG. 5 schematically illustrates a high-level architecture view of an example network architecture for a communication environment 300, e.g., a 5G System, in which one or more embodiments of the technique may be implemented.

The standardization organization Third Generation Partnership Project (3GPP) has specified and is further in the processes of specifying a new Radio Interface 318 called NR or 5G or G-UTRA as well as a Next Generation Packet Core Network 312 (NG-CN or NGC).

The communication environment 300, e.g., the 5G System, may comprise any of the features disclosed in the document 3GPP TR 23.799 (e.g., version 14.0.0 or 0.3.0) and/or the document TS 23.501 (e.g., version 15.0.0 or 0.3.0). The NGC 312 may comprise at least one of an Authentication Server Function (AUSF), a User Data Management (UDM), an Access and Mobility Function (AMF), a Session Management Function (SMF) and a Policy Control Function (PCF).

Nodes of the communication environment 300 may be connected by interfaces or reference points. The reference points in a 5G implementation of the communication environment 300 may comprise at least one of:

N2: Reference point for the control plane between NextGen (R)AN 318 and NextGen Core 312.

N3: Reference point for the user plane between NextGen (R)AN 318 and NextGen Core 312.

N1: Reference point for the control plane between NextGen UE 302 and NextGen Core 312.

N6: Reference point between the NextGen Core 312 and a data network (DN). The data network may be an operator external public or private data network or an intra-operator data network, e.g. for provision of IP-Multimedia Subsystem (IMS) services. This reference point may correspond to SGi for 3GPP accesses.

The 5G RAN contains base stations 306 that support evolved LTE and/or New Radio (NR) radio access.

A new QoS framework has been discussed for the 5G system. In the new QoS framework, the QoS-flow concept replaces the EPS bearer concept. A QoS-flow requires a given end-to-end QoS level. QoS-flows can be either GBR or non-GBR. Each QoS-flow is assigned a QoS-flow ID (QFI) which is used to identify the flow in the 5G system. The number of QoS-flows per UE might be larger than the number of EPS bearers per UE, thus several QoS-flows with similar QoS requirements may be mapped over the same DRB over the Uu interface. There is a two-level mapping, first level between SDF-flows to QoS-flows and second level between QoS-flows to DRBs. The RAN controls the QoS-flows to DRBs mapping and in case RAN decides that there is a flexible (e.g., other than 1:1) mapping between QoS-flows and DRBs, this mapping shall be transparent to the upper layers and shall have no impact on the N3 marking. Each QoS-flow has an associated 5G QoS indicator (5QI) referring to QoS characteristics (e.g. Packet Delay Budget, PDB, etc.) and an ARP parameter. A limited number of 5QI characteristics is expected to be standardized (the role of 5QI in 5GS framework is expected to be similar as the role of QCI in the EPS bearer framework). It is up to the RAN to define the QoS-flows to DRBs mapping based on the 5QI.

There are two types of QoS-profiles, namely "A-type QoS profiles" which have predefined QoS characteristics and "B-type QoS profiles" which have QoS characteristics dynamically signaled to the RAN over the N2 interface. The mapping between QoS-flows and DRBs is performed by a new AS layer protocol (e.g., PDAP) on top of PDCP. More details about the new QoS framework are provided below.

The 5G QoS model supports QoS flow based framework. The 5G QoS model supports both QoS flows that require guaranteed flow bit rate and QoS flows that do not require guaranteed flow bit rate. The 5G QoS model also supports reflective QoS. The QoS flow is the finest granularity of QoS differentiation in the PDU session. A QoS Flow ID (QFI) is used to identify a QoS flow in the 5G system. User Plane traffic with the same QFI value within a PDU session receives the same traffic forwarding treatment. The QFI is carried in an encapsulation header on N3 i.e. without any changes to the end-to-end (e2e) packet header. It can be applied to PDUs with different types of payload, i.e. IP packets, non-IP PDUs and Ethernet frames. The QFI shall be unique within a PDU session.

NOTE: A certain range of QoS Flow IDs (QFIs) is reserved for A-type QoS flows where the "full" QoS profile will not be used. These QFIs will map directly to standardized 5QIs and a default ARP value.

Each QoS flow (GBR and Non-GBR) is associated with the following QoS parameters:
  5G QoS Indicator (5QI),
  Allocation and Retention Priority (ARP).

Each GBR QoS flow is in addition associated with the following QoS parameters:
  Guaranteed Flow Bit Rate (GFBR)—UL and DL;
  Maximum Flow Bit Rate (MFBR)—UL and DL;
  Notification control.

The QoS parameters of a QoS flow are provided to the (R)AN over N2 at PDU Session or at QoS flow establishment and when 5G-RAN is used at every time the User Plane is activated. QoS parameters may also be pre-configured in the (R)AN for non-GBR QoS flows (i.e. without the need to be signaled over N2). The network provides QoS rules to the UE for the classification and marking of UL traffic, i.e. the association of uplink traffic to QoS flows. These rules can be explicitly signaled over N1, pre-configured in the UE or implicitly derived by UE from reflective QoS. A QoS rule contains the QFI of the QoS flow, packet filters and corresponding precedence values. A default QoS rule is provided to the UE at PDU Session establishment, i.e. the default QoS rule shall include a packet filter which may be a match-all packet filter and an evaluation precedence value with highest possible value. In addition, pre-authorized QoS rules may be provided to the UE. QoS rules can be also provided at QoS flow establishment.

Figure 6:
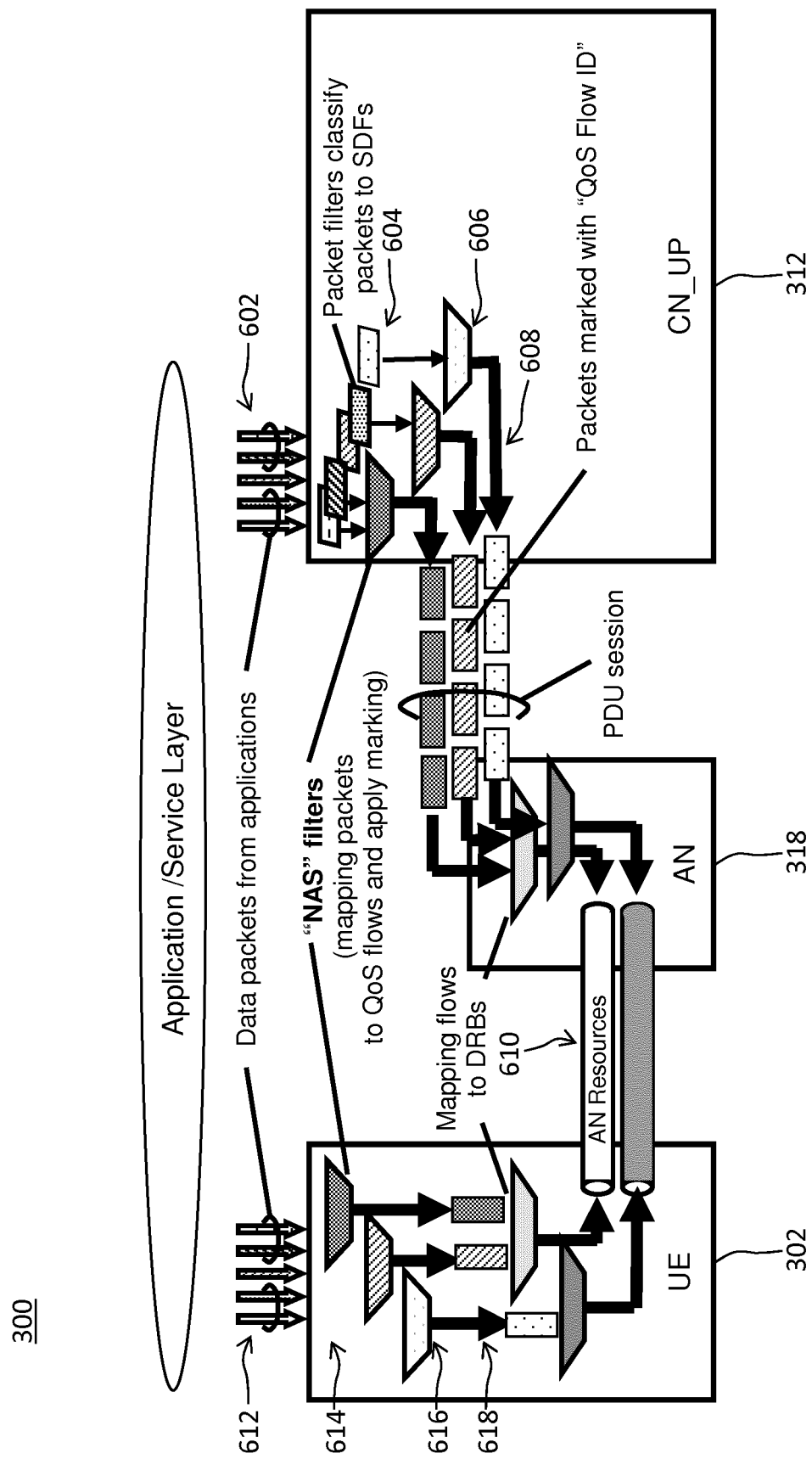
FIG. 6 shows a flow diagram for classifying and mapping QoS data flows to particular resources for communication.

The principle for classification and marking of User Plane traffic to QoS Flows and mapping to AN resources is illustrated in FIG. 6

In DL incoming data packets 602 are classified based on SDF filters 604. The CN 312 conveys the classification of the User Plane traffic belonging to a QoS flow 608 through an N3 User Plane (UP) marking 606 using a QFI. All A-type QoS flows 608 are allocated a standardized or pre-defined QFI value, and the standardized or pre-defined QFI value is associated with a specific 5QI value and default ARP. The AN 318 binds QoS flows 608 to AN resources 610 (e.g., Data Radio Bearers, DRBs, in case of in case of 3GPP RAN). There is no strict 1:1 relation between QoS flows and AN resources 610. It is up to the AN 318 to establish the necessary AN resources 610 to map the QoS flows to DRBs, so that the UE 302 receives the QFI (and reflective QoS can be applied).

In UL, the UE 302 classifies packets 612 based on uplink packet filters 614 in the QoS rules and conveys the classification of the User Plane traffic belonging to a QoS flow 618 through a User Plane (UP) marking 616 using the QFI in the corresponding QoS rule. The UE 302 binds QoS flows to AN resources 610.

The UE 302 evaluates for a match, first the uplink packet filter 614 amongst all packet filters 614 in the QoS rules that has the lowest evaluation precedence index and, if no match is found, proceeds with the evaluation of uplink packet filters in increasing order of their evaluation precedence value. This procedure shall be executed until a match is found or all uplink packet filters 614 have been evaluated. If a match is found, the uplink data packet 612 is with the QFI that is associated with the matching packet filter. If no match is found and the default QoS rule contains one or more uplink packet filters 614, the UE 302 shall discard the uplink data packet 612.

Two ways to control QoS flows 608 and/or 618 are supported:
1) For A-type QoS flows, all the necessary QoS profile(s) (i.e. QoS Parameters) are either sent to (R)AN via N2 at time of PDU Session establishment or when the user plane of the PDU session is activated and no additional signaling is required at the time traffic for the corresponding QoS flows start, or the QoS profiles are pre provisioned or standardized and no N2 signaling is required.
2) For B-type QoS flows, all the necessary QoS profile(s) (i.e. 5G QoS characteristics using either 5QI or individual provided and QoS Parameters) are sent to (R)AN with N2, N7, N11 signaling. B-Type QoS Flows can be added or removed dynamically via signaling during the PDU session.

The A- and B-type QoS flows may be referred to using different terminology.
  NOTE 1: A-type and B-type QoS flows must use a different value range for the QFI. There can be multiple A-type and/or B-type 5G QoS Flows with unique QoS profile per each QoS flow within a PDU session.
  NOTE 2: For A-type QoS flows, the AN 302 derives the 5G QoS characteristics from the 5QI value the QFI is referring to.
  NOTE 3: In a 3GPP access, it is not prevented to use A-type GBR 5G QoS Flows, but since admission control in (R)AN 318 will be performed at time of PDU Session establishment, this could lead to resource waste until the traffic of the SDFs mapped to this 5G QoS Flow starts.

The following characteristics apply for processing of downlink traffic:
  UPF maps Service data flow (SDF) to QoS flows 608
  UPF performs Session AMBR enforcement and also performs PDU counting for support of charging.
  UPF transmits the PDUs of the PDU session in a single tunnel between 5GC 312 and (R)AN 318, the UPF includes User Plane marking 606 (including the 5QI for non-3GPP accesses) in the encapsulation header. In addition, UPF may include an indication for reflective QoS activation in the encapsulation header.
  UPF performs transport level packet marking in downlink, e.g. setting the Diffsery (also: DiffServ) Code point in outer IP header. Transport level packet marking can be based on the 5QI and ARP of the associated QoS flow.
  (R)AN 318 maps PDUs from QoS flows to access-specific resources based on the QFI and the associated 5G QoS characteristics and parameters, also taking into account the N3 tunnel associated with the downlink packet.
  NOTE 4: Packet filters (e.g., 604 and/or 614) are not used for binding of QoS flows onto access-specific resources in (R)AN 318.
  If reflective QoS applies, the UE 302 creates a new derived QoS rule. The packet filter in the derived QoS rule is derived from the (i.e. the header of the) DL packet, and the User Plane marking 606 of the derived QoS rule is given the User Plane marking of the DL packet.

Following characteristics apply for processing of uplink traffic:
  UE 302 uses the stored QoS rules to determine mapping 614 between SDFs and QoS flow. UE transmits the UL PDUs using the corresponding access specific resource for the QoS flow based on the mapping provided by RAN.

(R)AN transmits the PDUs over N3 tunnel towards UPF. When passing an UL packet from (R)AN to CN, the (R)AN determines the QFI value, which is included in the encapsulation header of the UL PDU, and selects the N3 tunnel.

(R)AN performs transport level packet marking in the uplink, transport level packet marking can be based on the 5QI and ARP of the associated QoS Flow.

UPF verifies whether QFIs in the UL PDUs are aligned with the QoS Rules provided to the UE 302 or implicitly derived by the UE 302 (e.g., in case of reflective QoS).

UPF performs Session AMBR enforcement and counting of packets for charging.

For UL Classifier PDU sessions, UL and DL Session AMBR shall be enforced in the UPF that supports the UL Classifier functionality. For multi-homed PDU sessions, UL and DL Session-AMBR is enforced separately per UPF that terminates the N6 interface (i.e. without requiring interaction between the UPFs). The (R)AN 318 shall enforce Max Bit Rate (UE-AMBR) limit in UL and DL per UE for non-GBR QoS flows. The UE 302 shall perform UL rate limitation on PDU Session basis for non-GBR traffic using Session-AMBR, if the UE 302 receives a PDU session AMBR. Rate limit enforcement per PDU session applies for flows 618 that do not require guaranteed flow bit rate. MBR per SDF is mandatory for GBR QoS flows but optional for non-GBR 5G QoS flows. The MBR is enforced in the UPF.

Figure 3:
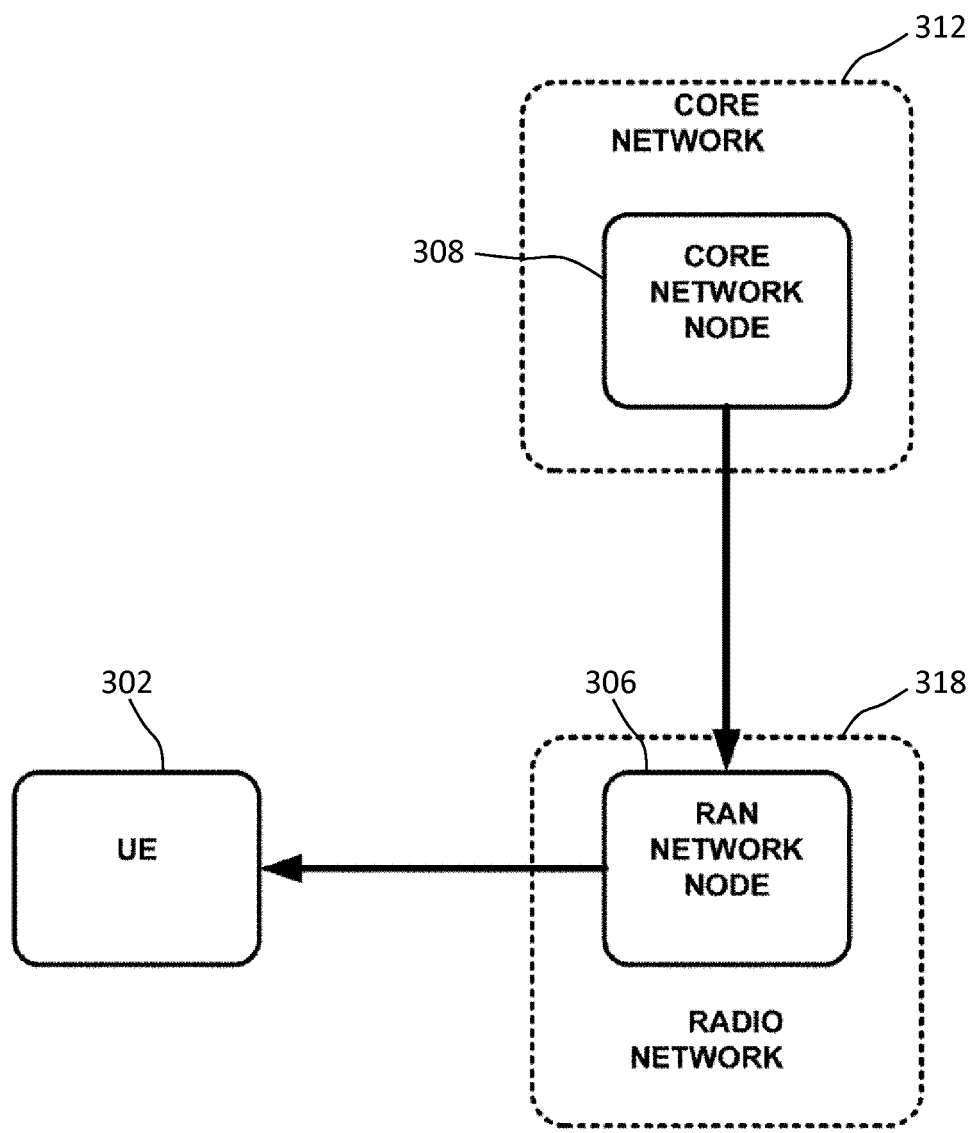
FIG. 3 illustrates a communication environment corresponding to example embodiments.

FIG. 3 illustrates a communication environment 300 that includes a UE 302 configured to receive one or more QoS-classified data flows from a core network 312 having a core network node 308 via a RAN network node 306 of a radio access network 318. In an aspect, the RAN network node 306 is configured to remap and/or remove one or more QoS-specific data flows upon a determination that an inactivity timer has reached a threshold value, e.g., according to example embodiments below and/or the method 200, optionally including additional details regarding the specifics.

Furthermore, each of the UE 302, the core network node 308 and/or the radio access network node 312 can perform the remapping and removing functions herein in some capacity. Thus, for purposes of the present disclosure, when referring to a generic "device" as in FIG. 1 or 4, that device 100 can refer to any of these specific devices.

Alternatively or in addition to the implementation of a method 200 described above, FIG. 2 illustrates an exemplary method 200 performed by a device, e.g., the device 100, according to the present disclosure. For instance, method 200 may include at block 202 obtaining, a time period for which the data flow has been inactive, wherein the data flow is defined by a Quality of Service (QoS) requirement of the data associated with the data flow, and at block 204, determining, based on the time period, to release a mapping between the data flow and a radio bearer.

In addition, though not shown explicitly in FIG. 2, the following aspects are optional features of method 200:

determining, based on the time period and/or a number of data flows mapped to the radio bearer, to remove the data flow.

determining that the time period is greater than or equal to a threshold value.

the threshold value is preconfigured by an access network and/or a core network.

the threshold value is dynamically configured by an access network and/or a core network.

mapping the data flow to a different radio bearer based on the time period.

resuming data communication on the data flow using the different radio bearer upon the data flow becoming active.

the different radio bearer is a default radio bearer.

obtaining the time period comprises: determining that the data flow is inactive; starting an inactivity counter that maintains the time period in response to determining that the data flow is inactive; and obtaining the time period from the inactivity counter.

determining that the data flow is inactive comprises determining that no user data is queued for transmission at one or more of the device and/or one or more other devices.

obtaining one or more rules from a network node for managing the data flow.

determining, based on the one or more rules, to release the mapping and/or to remove the data flow.

instructing a user equipment (UE) to release the mapping and/or to remove the data flow.

providing one or more rules for managing the data flow to a UE.

wherein the network node is a device in a radio access network.

identifying that a UE has been or is to be handed over from a current cell to a different cell has or is to reselect from the current cell to the different cell.

the identifying comprises receiving, from another device in the radio access network, a request to provide one or more parameters of the data flow to the other device.

based on the identifying, providing the time period, the mapping, a data flow identifier, an amount of data transferred over the data flow, a total time since the data flow was activated, one or more bit rates of the data flow, or any other characteristic of the data flow to another device of the wireless communication system that manages the different cell.

maintaining the time period when a UE associated with the data flow is in an inactive state.

wherein the network node is a device in a core network.

based on determining to release the mapping and/or to remove the data flow comprises transmitting a command to an access network node or a UE to release the mapping and/or to remove the data flow.

wherein the time period is measured in units of seconds, minutes, frames, transmission time intervals, subframes, slots, symbols, or any other unit indicative of time.

wherein the data flow has an associated data flow identifier.

wherein the data flow identifier is assigned by a core network node.

Figure 4:
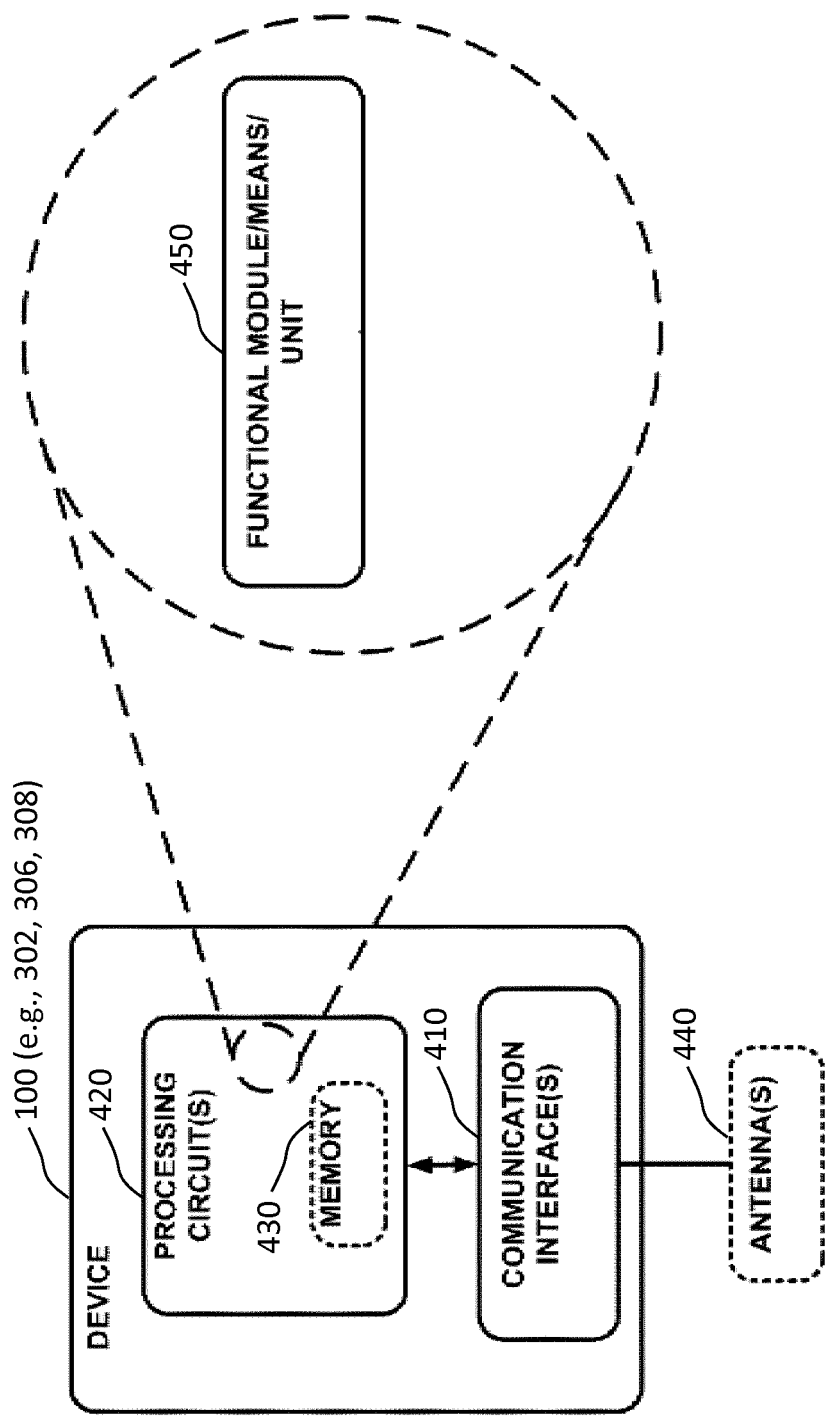
FIG. 4 illustrates details of an example device according to one or more embodiments.

FIG. 4 illustrates additional details of an example device 100 according to one or more embodiments. The device 100 is configured, e.g., via functional means or units 450, to implement processing to perform the aspects described above in reference to FIG. 2 and method 200.

In at least some embodiments, the device 100 comprises one or more processing circuits 420 configured to implement processing of the method 200 of FIG. 2, such as by implementing functional means or units above. In one embodiment, for example, the one or more processing circuits 420 implement functional means or units as respective circuits. The circuits in this regard may comprise circuits dedicated to performing certain functional processing and/or one or more microprocessors in conjunction with memory 430. In embodiments that employ memory 430, which may comprise one or several types of memory such as read-only memory (ROM), random-access memory, cache memory, flash memory devices, optical storage devices, etc., the memory 430 stores program code that, when executed by the one or more for carrying out one or more microprocessors, carries out the techniques described herein.

In one or more embodiments, the device 100 also comprises one or more communication interfaces 410. The one or more communication interfaces 410 include various components (e.g., antennas 440) for sending and receiving data and control signals. More particularly, the one or more interfaces 410 include a transmitter that is configured to use known signal processing techniques, typically according to one or more standards, and is configured to condition a signal for transmission (e.g., over the air via one or more antennas 440). Similarly, the interface(s) include a receiver that is configured to convert signals received (e.g., via the antenna(s) 440) into digital samples for processing by the one or more processing circuits. The transmitter and/or receiver may also include one or more antennas 440. By utilizing the one or more communication interfaces 410 and/or the one or more antenna(s) 440, the device 100 is able to communicate with other devices to transmit QoS data flows (e.g., 608 and/or 618) as well as manage the mapping of these flows to radio bearers, remap the flows to different bearers, and/or remove the flows entirely.

The following disclosure presents more detailed aspects of the above-mentioned features, and should be considered to be performable by device 100 and included in alternative embodiments of method 200.

Several A-type QoS flows can be established at the beginning of the PDU session, even if there is no data traffic associated to these flows. B-type QoS-flows are instead (or typically) established on-demand, e.g., when there is traffic associated to the flows. In addition, GBR flows will be subject to admission control in the RAN. The problem is that there is no clear solution that describes how to release the QoS flows and/or their mapping to DRBs in the RAN.

One solution would be that the NGC control plane (CP) explicitly informs the RAN 318 to release QoS flows (e.g., similar how it is performed in EPC/LTE). The RAN 318 can decide to also release the corresponding DRBs, i.e., the DRBs on which the flows were mapped. However, this solution does not allow any means to only remove the mapping between a QoS flow and a DRB, and keep the QoS flow, it only allows to remove the complete QoS flow. In addition, the mechanism requires a trigger from the CN 312, i.e. it does not allow the RAN 318 to by itself remove QoS flows. Therefore, a solution of the corresponding problem is needed.

An example solution presented herein comprises at least one of the following several parts:

A new or dedicated parameter is associated to each QoS flow in the RAN 318. The new or dedicated parameter is referred to as "inactivity counter". The inactivity counter keeps track of how long a QoS flow has been inactive (e.g., how long there was no UP traffic associated to the QoS flow).

The RAN 318 can decide to:
(1) Release the mapping between QoS flows and DRBs based on the status of the inactivity counters; and/or
(2) Release some QoS flows and the corresponding DRBs based on the status of their inactivity counters.

Additionally, the RAN 318 can signal to the ON 312 that it has released a QoS flow in the RAN 318, which will enable the 5GC 312 to signal to the UE 302 to remove the QFI in UE 302.

Upon UE mobility, the status of the inactivity counters should be conveyed to the target RAN node. Based on the status of the inactivity counters, the target RAN node can decide to: (1) release the mapping between QoS flows and DRBs and/or (2) not admit some QoS flows and corresponding DRBs. Alternatively, for the case of the mobility invoking signaling via the CN 312 (e.g., the AMF and/or the SMF) the status of the inactivity counters should be conveyed to the CN 312 (e.g., the AMF and/or the SMF). Based on the status of the inactivity counters, the CN 312 can decide to not request these QoS flows being configured in the target RAN.

Some advantages of the solution are that:

It allows to release the mapping between QoS flows and DRBs. This enables to also remove unused DRBs 610, increasing the efficiency in the use of the radio resources. Removing DRBs 610 can also free up memory and processing resources in the network and UE increasing capacity and reducing UE and network power (or battery) consumption.

It enables the RAN to release QoS flows, while in existing solutions only the NGC is allowed to release QoS flows.

It allows to remove QoS flows and/or their mapping to DRBs upon mobility, avoiding the risk of propagating a large number of unused QoS flows and DRBs among RAN nodes.

The example solution comprises at least one of the following parts.

Each QoS flow is associated a new parameter by the RAN 318, namely "inactivity counter". The inactivity counter is started when the QoS flow becomes inactive, e.g., when there is no UP data transmission associated to the QoS flow. If new traffic associated to the QoS-flow is observed while the inactivity counter is running, the counter should reset to its original value. The QoS flow is used to keep track of how long a QoS flows is inactive.

The inactivity counter could be a counter counting seconds, minutes etc. since last activity, or it could count frames or transmission time instances since last activity Additionally, other information could be maintained for the QoS flow (handled in the same way as the inactivity counter) e.g.

Amount of data transferred

Total time since the flow was activated

Bit-rates (Avg., Peak, Minimum)

The inactivity counters can be used by the RAN 318 for different purposes:

The RAN 318 can release the mapping between QoS flows and DRBs based on the status of the inactivity counters. For example, the RAN 318 can decide to remap an old QoS flow from a specific DRB to the default DRB, when the value of its inactivity counter becomes higher than a given threshold. The RAN 318 can also decide to remove the specific DRB, e.g., if there are no more flows mapped onto it.

The decision to remap or remove QoS flow may also depend on other QoS parameters e.g. 5QI, ARP, minimum and/or maximum and/or guaranteed bitrates The decision could also consider additional information about the QoS flow discussed above.

The RAN 318 can remove some QoS flows based on the status of their inactivity counters. The RAN 318 can also decide to remove the corresponding DRBs, meaning the DRBs on which the flows were mapped, e.g., in case that no more flows mapped onto them.

Upon UE mobility, the status of the inactivity counters and other information should be conveyed to the target RAN node 306, together with the QoS flows and their mapping to the DRBs. Based on the status of the inactivity counters, the target RAN node 306 can decide to: (1) release the mapping between QoS flows and DRBs and/or (2) not admit some QoS flows and the corresponding DRBs based on the status of the inactivity counters.

Additionally, UE 302 may also maintain inactivity counters in similar way as the RAN node 306. The RAN 318 can then configure the UE 302 with rules when to remove or remap QoS flows to DRB based on inactivity. The rules may be specific to a QoS flow or be applicable to all QoS flows.

Example: The network may configure the UE 302 to remove any QoS mapping for QoS flows which has not been used the last 5 minutes. In this case the UE 302 may map those flows to the default DRB.

The inactive counters above may, depending on the configuration, be maintained also for UEs 302 in RRC_INACTIVE, or they could be reset.

Example: UE 302 returns form RRC_INACTIVE after 5 minutes. The RAN node 306 has maintained the inactive counter during this time and decides to remove or remap some QoS flows when the UE 302 returns.

When the UE 302 returns in a different RAN node 306 then before the new RAN node 306 will fetch the UE context from the old RAN node 306. In this case it may also fetch the inactivity counters. This may also give information to the RAN node 306 how long the UE 302 has been in RRC_INACTIVE which could be useful for deciding how many DRBs to setup resources for.

Figure 7:
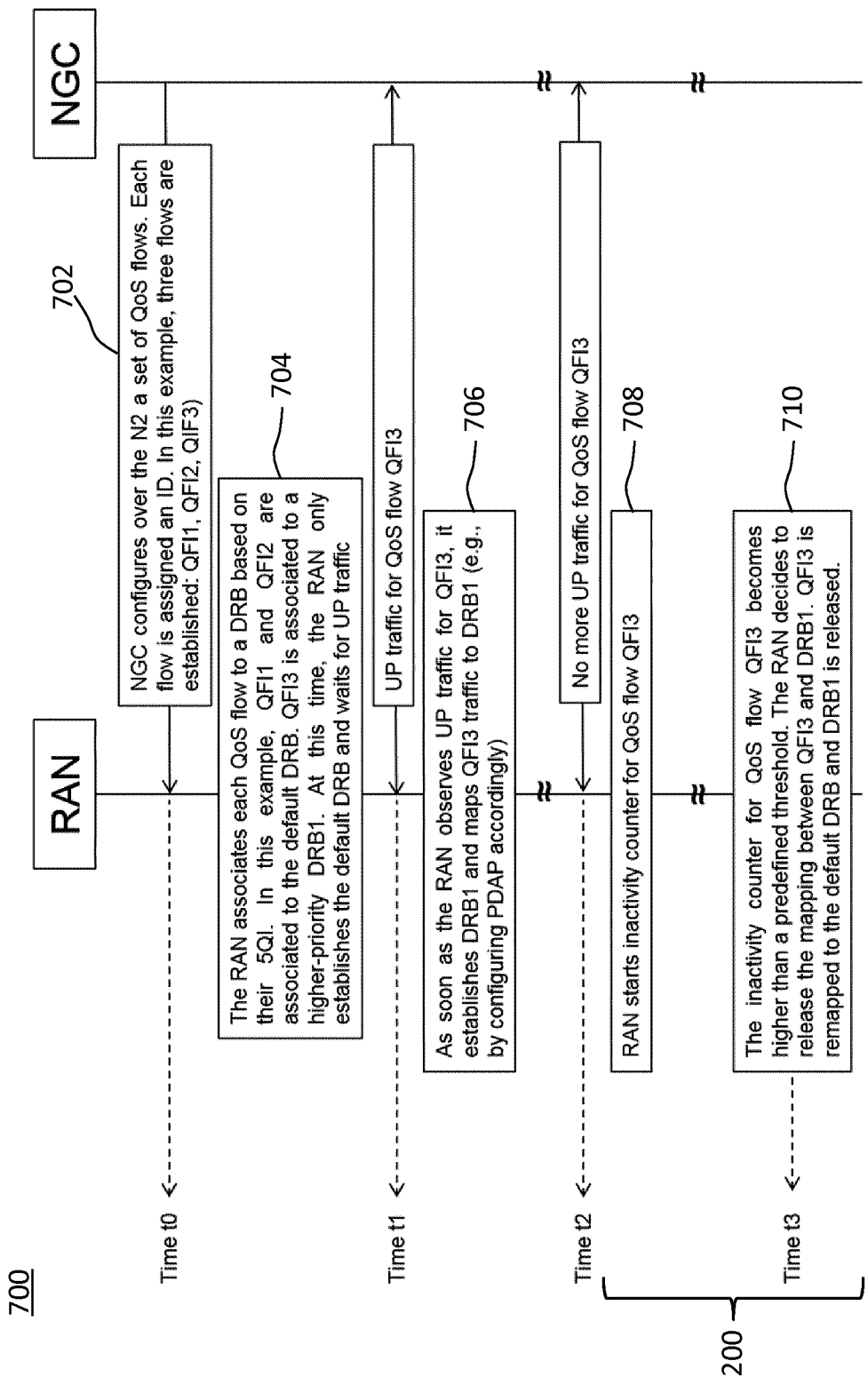
FIG. 7 shows an example implementation flowchart according to the present disclosure.

FIG. 7 presents an implementation scenario 700 (which is non-limiting) described below. In the following, a simple example of how the inactivity counter can be used to release the mapping between a QoS flow and a DRB is provided. It is worth noting that this is just an illustrative example and that the same procedure can also be used in other scenarios (e.g., for removing QoS flows in the RAN 318). A similar procedure can also be used at handover to decide to release the mapping between QoS flows and DRBs and/or to not admit some QoS flows (and corresponding DRBs).

In a step 702 at time t0, the NGC 312 configures in the RAN 318 over the N2 interface a list of authorized QoS flows. In this example, three QoS flows are configured with flow ID: QFI1, QFI2 and QFI3. In a step 704, the RAN 318 associates each QoS flow to a DRB based on the 5QI. In this example, QFI1 and QFI2 are associated to a default DRB, while QFI3 is associated to a higher-priority DRB1. At this time, the RAN 318 may decide to only establish the default DRB.

In a step 706 at time t1, UP traffic for QoS flow QFI3 is observed. The RAN 318 establishes DRB1 and maps the traffic of QFI3 to DRB1 (i.e., it maps QFI3 to DRB1). This can be done for instance by configuring opportunely the PDAP protocol.

In a step 708 at time t2, no more UP traffic for QoS flow QFI3 is observed. The RAN starts the inactivity counter for QoS flow QFI3 to keep track of how long it stays inactive, e.g., according to the step 202.

In a step 710 at time t3, the value of the inactivity counter for QFI3 has become higher than a given threshold. In this example, the RAN decides to release the mapping between QFI3 and DRB1, e.g., according to the step 204. QFI3 is associated to the default DRB, while DRB1 is released. If at a later time new traffic for QFI3 is observed, the RAN 318 can decide to re-establish DRB1.

In FIG. 7, QFI3 is an (non-limiting) example for a QoS flow. DRB1 is a (non-limiting example) for a DRB.

Figure 8:
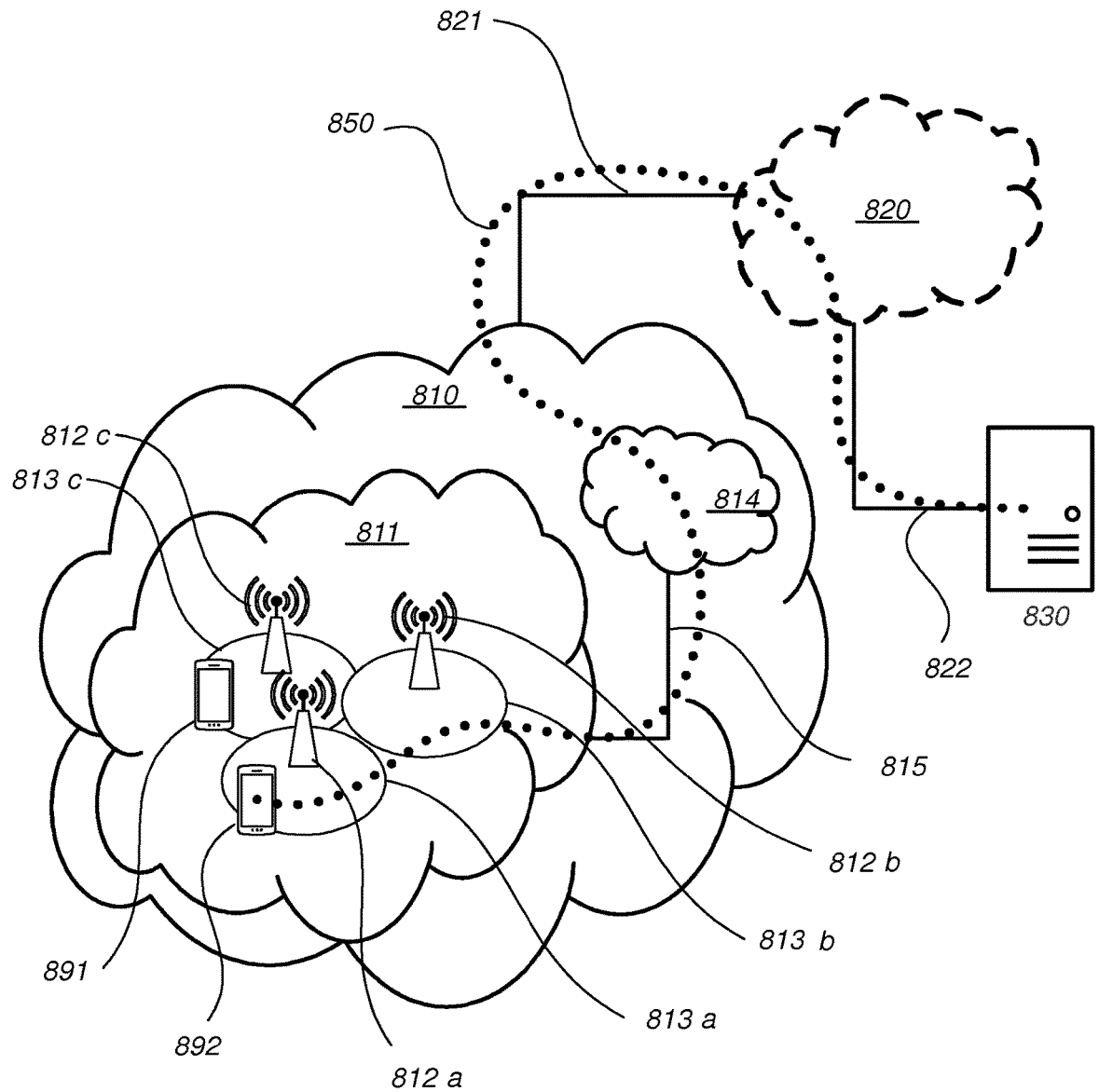
FIG. 8 schematically illustrates a telecommunication network connected via an intermediate network to a host computer.

With reference to FIG. 8, in accordance with an embodiment, a communication system 800 includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first user equipment (UE) 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. The connections 821, 822 between the telecommunication network 810 and the host computer 830 may extend directly from the core network 814 to the host computer 830 or may go via an optional intermediate network 820. The intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system 800 of FIG. 8 as a whole enables connectivity between one of the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, a base station 812 may not or need not be informed about the past routing of an incoming downlink communication with data originating from a host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as a UE 930 connecting via an OTT connection 950 terminating at the UE 930 and the host computer 910. In providing the service to the remote user, the host application 912 may provide user data, which is transmitted using the OTT connection 950. The user data may depend on the location of the UE 930. The user data may comprise auxiliary information (e.g., velocity and density of a road traffic flow for autonomous driving) or precision advertisements (also: ads) delivered to the UE 930. The location may be reported by the UE 930 to the host computer, e.g., using the OTT connection 950, and/or by the base station 920, e.g., using a connection 960.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with a UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
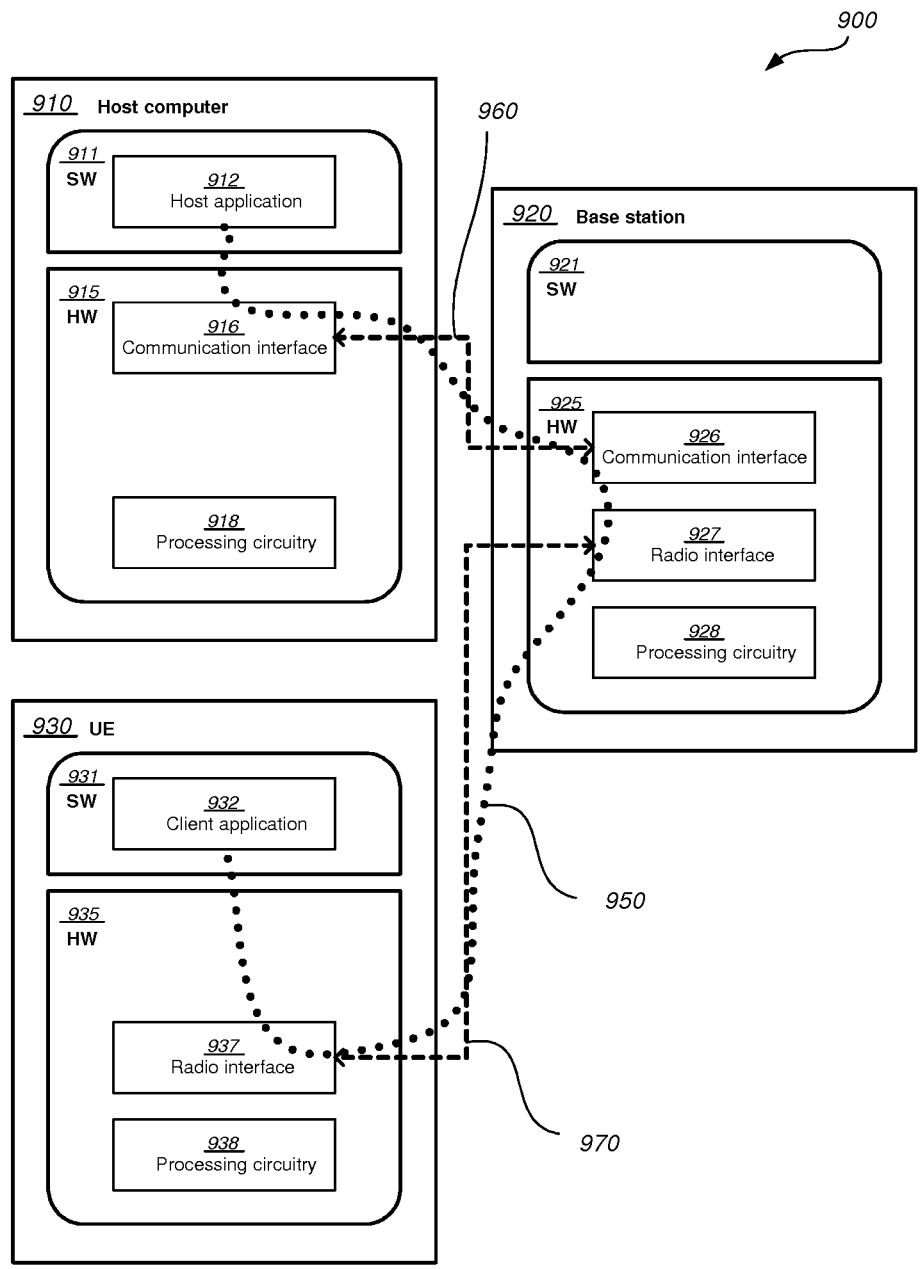
FIG. 9 shows a generalized block diagram of a host computer communicating via a base station with a user equipment over a partially wireless connection.

It is noted that the host computer 910, base station 920 and UE 930 illustrated in FIG. 9 may be identical to the host computer 830, one of the base stations 812*a*, 812*b*, 812*c* and one of the UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the use equipment 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 950 between the host computer 910 and UE 930, in response to variations in the measurement results. The measurement procedure and/or the network functionality for reconfiguring the OTT connection 950 may be implemented in the software 911 of the host computer 910 or in the software 931 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer's 910 measurements of throughput, propagation times, latency and the like. The measurements may be implemented in that the software 911, 931 causes messages to be transmitted, in particular empty or "dummy" messages, using the OTT connection 950 while it monitors propagation times, errors etc.

Figures 10, 11:
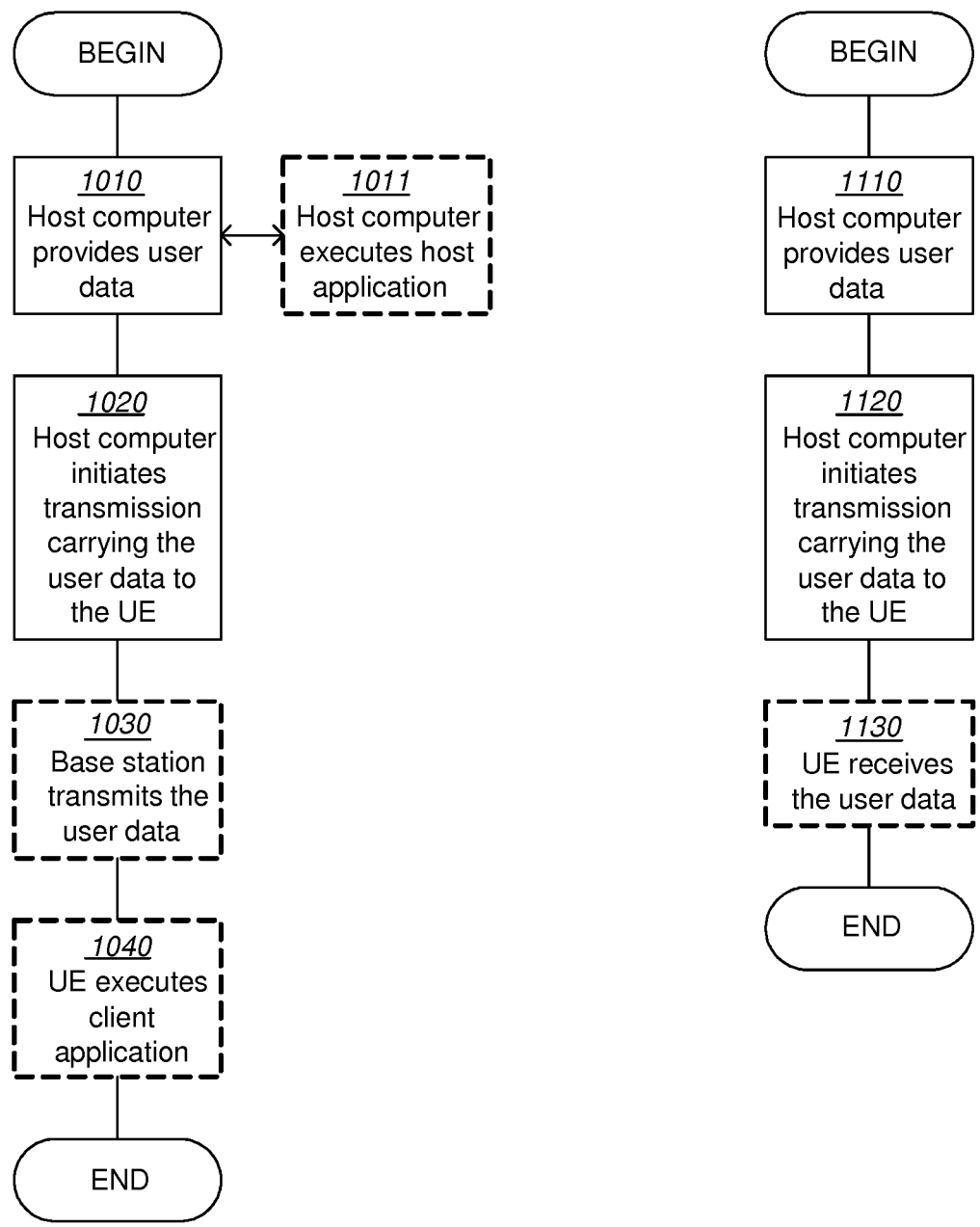
FIGS. 10 and 11 show flowcharts for methods implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 1010 of the method, the host computer provides user data. In an optional substep 1011 of the first step 1010, the host computer provides the user data by executing a host application. In a second step 1020, the host computer initiates a transmission carrying the user data to the UE. In an optional third step 1030, the base station transmits to the UE the user data which was carried in the transmission that the host computer initiated, in accordance with the teachings of the embodiments described throughout this disclosure. In an optional fourth step 1040, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 1110 of the method, the host computer provides user data. In an optional substep (not shown) the host computer provides the user data by executing a host application. In a second step 1120, the host computer initiates a transmission carrying the user data to the UE. The transmission may pass via the base station, in accordance with the teachings of the embodiments described throughout this disclosure. In an optional third step 1130, the UE receives the user data carried in the transmission.

In any embodiment, a RAN node may maintain an inactivity counter (optionally, as well as potentially other information) for different QoS flows. The inactivity counter may be updated based on activity for that specific QoS flow. The counter may also be exchanged with other nodes at mobility. The counter may be used to decide when to remove or remap QoS flows to different data radio bearers.

Those skilled in the art will also appreciate that embodiments herein further include corresponding computer programs. A computer program comprises instructions which, when executed on at least one processor of the device 100, cause the device 100 to carry out any of the respective processing described above. Embodiments further include a carrier containing such a computer program. This carrier may comprise one of an electronic signal, optical signal, radio signal, or computer readable storage medium. A computer program in this regard may comprise one or more code modules corresponding to the means or units described above.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method for a device to manage a data flow in a wireless communication system, the method comprising:
providing one or more rules for managing the data flow to a user equipment, UE, the one or more rules including remapping a data flow from a radio bearer to a different radio bearer based on a time period in which the data flow has been inactive and on one or more Quality of Service (QoS) parameters, the different radio bearer being an already established default radio bearer;
obtaining the time period in which the data flow has been inactive, the data flow being defined by a QoS requirement of data associated with the data flow, the obtaining the time period including:
determining that the data flow is inactive;
starting an inactivity counter that maintains the time period in response to determining that the data flow is inactive, the inactivity counter being dedicated to the data flow; and
obtaining the time period from the inactivity counter;
determining, based on the time period exceeding a threshold, a release of a mapping between the data flow and a radio bearer;
mapping the data flow to the different radio bearer based on the time period and the one or more QoS parameters;
releasing, after mapping the data flow to the different radio bearer, the mapping between the data flow and the radio bearer;
determining whether other data flows are mapped to the radio bearer, and based on determining other data flows are not mapped to the radio bearer, releasing the radio bearer; and
the device being a radio access network node.

2. The method of claim 1, further comprising determining to remove the data flow based on at least one of the time period and a number of data flows mapped to the radio bearer.

3. The method of claim 2, wherein determining to release the at least one of the mapping and to remove the data flow comprises determining that the time period is greater than or equal to a threshold value.

4. The method of claim 1, further comprising resuming data communication on the data flow using the different radio bearer upon the data flow becoming active.

5. The method of claim 1, wherein the determining that the data flow is inactive comprises determining that no user data is queued for transmission at least one of the device and one or more other devices.

6. The method of claim 1, further comprising determining, based on the one or more rules, to at least one of release the mapping to remove the data flow.

7. The method of claim 1, further comprising instructing a User Equipment (UE) to at least one of release the mapping and to remove the data flow.

8. The method of claim 1, wherein the identifying comprises receiving, from a second device in the radio access network, a request to provide one or more parameters of the data flow to a third device.

9. The method of claim 1, wherein the network node is a device in a core network.

10. A device for managing a data flow in a wireless communication system, the device comprising:
processing circuitry; and
memory containing instructions executable by the processing circuitry to cause the device to:
provide one or more rules for managing the data flow to a user equipment, UE, the one or more rules including remapping a data flow from a radio bearer to a different radio bearer based on a time period in which the data flow has been inactive and on one or more Quality of Service (QoS) parameters, the different radio bearer being an already established default radio bearer;

obtain the time period in which the data flow has been inactive, the data flow being defined by a QoS requirement of data associated with the data flow, obtaining the time period including:
  determining that the data flow is inactive;
  starting an inactivity counter that maintains the time period in response to determining that the data flow is inactive, the inactivity counter being dedicated to the data flow; and
  obtaining the time period from the inactivity counter;

determine, based on the time period exceeding a threshold, a release of a mapping between the data flow and a radio bearer;

map the data flow to the different radio bearer based on the time period and the one or more QoS parameters;

release, after mapping the data flow to the different radio bearer, the mapping between the data flow and the radio bearer;

determine whether other data flows are mapped to the radio bearer, and based on determining other data flows are not mapped to the radio bearer, releasing the radio bearer; and the device being a radio access network node.

11. A method for a device to manage a data flow in a wireless communication system, the method comprising:
  providing one or more rules for managing the data flow to a user equipment, UE, the one or more rules including remapping a data flow from a radio bearer to a different radio bearer based on a time period in which the data flow has been inactive and on one or more Quality of Service (QoS) parameters, the different radio bearer being an already established default radio bearer;
  obtaining the time period in which the data flow has been inactive, the data flow being defined by a QoS requirement of data associated with the data flow, the obtaining the time period including:
    determining that the data flow is inactive;
    starting an inactivity counter that maintains the time period in response to determining that the data flow is inactive, the inactivity counter being dedicated to the data flow; and
    obtaining the time period from the inactivity counter; and
  identifying that a user equipment, UE, at least one of:
    has been or is to be handed over from a current cell to a different cell; and
    has or is to reselect from the current cell to the different cell;
  the identifying including:
    receiving, from a second device in a radio access network of the wireless communication system, a request to provide one or more parameters of the data flow to a third device; and
    providing the one or more parameters of the data flow to the third device, the one or more provided parameters triggering determining, based on the time period exceeding a threshold, a release of a mapping between the data flow and a radio bearer;
  mapping the data flow to the different radio bearer based on the time period and the one or more QoS parameters;
  releasing, after mapping the data flow to the different radio bearer, the mapping between the data flow and the radio bearer;
  determining whether other data flows are mapped to the radio bearer, and based on determining other data flows are not mapped to the radio bearer, releasing the radio bearer;
  the device being a radio access network node; and
  the other device being a radio access network node managing the different cell.

12. The method of claim 11, wherein the third device of the wireless communication system manages the different cell.

* * * * *